US011088860B1

(12) United States Patent
Hockley

(10) Patent No.: US 11,088,860 B1
(45) Date of Patent: Aug. 10, 2021

(54) DISTRIBUTING WORK IN A DISTRIBUTED VIDEO CONFERENCING SYSTEM BY USING A CONSISTENT HASH FUNCTION

(71) Applicant: Pexip AS, Oslo (NO)

(72) Inventor: Benjamin John Hockley, Reading (GB)

(73) Assignee: Pexip AS, Oslo (NO)

( * ) Notice: Subject to any disclaimer, the term of this patent is extended or adjusted under 35 U.S.C. 154(b) by 0 days.

(21) Appl. No.: 17/168,411

(22) Filed: Feb. 5, 2021

(30) Foreign Application Priority Data

Feb. 19, 2020 (NO) .................................. 20200219

(51) Int. Cl.
*H04L 12/18* (2006.01)
*H04L 9/06* (2006.01)
*H04N 7/15* (2006.01)

(52) U.S. Cl.
CPC ........ *H04L 12/1818* (2013.01); *H04L 9/0643* (2013.01); *H04L 12/1822* (2013.01); *H04N 7/155* (2013.01)

(58) Field of Classification Search
None
See application file for complete search history.

(56) References Cited

U.S. PATENT DOCUMENTS

| 2015/0358472 | A1  | 12/2015 | Rosenberg |             |
|--------------|-----|---------|-----------|-------------|
| 2017/0099361 | A1  | 4/2017  | Digilov et al. |         |
| 2018/0176510 | A1* | 6/2018  | Pepperell | ............ H04L 65/1069 |
| 2020/0007819 | A1* | 1/2020  | Dahle     | ................ H04L 41/0823 |

FOREIGN PATENT DOCUMENTS

| EP | 1678951 B1    | 4/2018 |
|----|---------------|--------|
| WO | 2016086371 A1 | 6/2016 |

OTHER PUBLICATIONS

Norwegian Search Report dated Sep. 18, 2020 for corresponding Norwegian application No. 20200219; consisting of 2-pages.
Office Action dated Sep. 18, 2020 for corresponding Norwegian Application No. 20200219; consisting of 3-pages.

(Continued)

*Primary Examiner* — Stella L. Woo
(74) *Attorney, Agent, or Firm* — Christopher & Weisberg, P.A.

(57) ABSTRACT

The present invention includes a method and a system providing balancing of work items required to be completed as a whole over the available computing systems in a video conference node cluster, in addition to providing sufficient redundancy among conference nodes by means of consistent hash functions.

Consistent hashing is based on mapping each object or work item to a point on a virtual circle. The system maps each available machine or node to many pseudo-randomly distributed points on the same circle.

The present invention can be used for example in monitoring calendar servers for scheduled video conferences and providing a user interface icon to endpoints participating in a scheduled video conference through which the endpoints enter the video conference, or monitoring dial-ins from an endpoint participating in a scheduled video conference and dialing out to the other endpoints participating in the scheduled video conference.

12 Claims, 3 Drawing Sheets

(56) References Cited

OTHER PUBLICATIONS

Extended European Search Report dated Mar. 24, 2021, for corresopnding European Application No. 20206973.8; consisting of 9 pages.
Lim, Zeng Hou, "How Consistent Hashing Is Used by Load Balancers to Distribute Requests", Feb. 14, 2020, retrieved from https://betterprogramming.pub/load-balancers-and-consistent-hashing-in-6-minutes-b5fc460aea4e, retrieved on Mar. 16, 2021; consisting of 10-pages.
Consistent Hashing, Feb. 13, 2020, retrieved from https://en.wikipedia.org/w/index.php?title=Consistent_hashing&oldid=940517229, retrieved on Mar. 16, 2021; consisting of 5-pages.

* cited by examiner

DISTRIBUTING WORK IN A DISTRIBUTED VIDEO CONFERENCING SYSTEM BY USING A CONSISTENT HASH FUNCTION

CROSS-REFERENCE TO RELATED APPLICATION

This application is related to and claims priority to Norwegian Patent Application No. 20200219, filed on Feb. 19, 2020, entitled DISTRIBUTING WORK IN A DISTRIBUTED VIDEO CONFERENCING SYSTEM BY USING A CONSISTENT HASH FUNCTION, the entirety of which is incorporated herein by reference.

FIELD

The present disclosure relates to the distribution of work in a distributed video conferencing system.

BACKGROUND

Transmission of moving pictures and audio in real-time is employed in several applications like video conferencing, net meetings and video telephony. Video conferencing systems allow for the simultaneous exchange of audio, video and data information among multiple conferencing sites. Control units such as Multipoint Control Units (MCUs) allow endpoints of multiple sites to intercommunicate in a conference.

A control unit links sites, endpoints and participants together by receiving conference signals from the sites/endpoints, processing the received signals, and transmitting the processed signals to appropriate sites/endpoints. The conference signals include audio, video, data and control information. The control unit may translate signals from one video or audio codec to another codec, change picture size, change video quality, change video quality, change bitrate, combine conference signals from multiple participants into various layouts etc. The control unit processes the received conference signals from one or more sites/endpoints based on the requirements¬/capabilities of each site/endpoint receiving signals from the control unit. This is in the following referred to as transcoding.

FIG. 1 illustrates an exemplary, distributed video conferencing system 100. The control unit, in traditional systems configured as a single unit, is here configured as a virtual entity comprising a plurality of interconnected conferencing nodes 101. The conferencing nodes handle all conference media and signaling to endpoints and other devices, and are typically deployed in different geographical locations. The different conferencing nodes are typically located close to large concentrations of users to reduce latency and improve QoE (Quality of Experience). The distributed video¬-conferencing system further comprises at least one Management Node 102. The purpose of the at least one Management Node is to create and manage Conferencing Nodes. The at least one Management Node is in neither the signaling nor the media path of a conference.

The at least one Management Node and the plurality of conferencing nodes are both software applications that are deployed as Virtual Machines (VMs) on host servers distributed around the globe. A deployment can reside on a server in a private data center or in an IaaS (Infrastructure as a Service) cloud service such as Amazon AWS, Microsoft Azure, IBM Softlayer, Google GCP. Conferencing Nodes may run on host servers in the same or different locations, allowing a globally distributed system. Two Conferencing Nodes may also be running on the same host server, for example to ensure service continuity during an upgrade of one of the Conferencing Nodes or software outage, and for maximum performance. Conferencing Nodes hosting the same conference may send the call media and other data, such as roster lists, commands, between each other over a secure backplane. The at least one Management Node may run on the same host server as a Conferencing Node, or on a different host server than any the Conferencing Nodes.

As distributed video conferencing evolves, and new features are added, the conferencing nodes are constantly assigned tasks other than the traditional in-conference ones, discussed above. One example of such a new feature is to capture information of scheduled video conferences from email servers or conference management tools to make it easier for invited participants to enter the scheduled video conference. An example of such feature is "One Touch Join" (OTJ), where one or more of the endpoints scheduled to participate in the conference are provided with a button on e.g. a touch screen uniquely associated with the scheduled conference, appearing just ahead of the scheduled start time, and only by pushing/touching that button, the participant will automatically be connected to the scheduled conference.

The capturing of scheduling information and provision of OTJ buttons will require constant monitoring, and in case of large numbers of potential participants and scheduled conferences, the load on the conference nodes will increase. As conference nodes from time to time may go down, be out of service, or will have to restart, it is also important to provide redundancy.

Generally, in the field of distributed video conferencing platforms, there are numerous situations in which work items must be processed in a distributed manner due to the processing burden involved and/or where there are side effects resulting from processing the work item which it would be undesirable to duplicate unduly.

A "work item" in this context might be a long-lived task that must run indefinitely, for example, as already indicated, monitoring a calendar for appointment creations, updates and cancellations, in the context of OTJ systems, or some other task that must be carried out for some undetermined amount of time, for example, ensuring that auto-dialled participants in a conference are processed correctly. It might also be a short-lived task that can be run to completion, e.g. processing an individual instance of a calendar appointment to extract/compute the video URI for a video meeting that is associated with that calendar appointment.

In other words, there has to be a general-purpose mechanism for distributing work between members of a cluster of cooperating distributed systems for scaling, load spreading, and redundancy.

There are several known solutions to this problem according to the prior art.

One of them is the formal distributed consensus algorithms such as Paxos en.wikipedia.org/wiki/Paxos (computer science) and Raft en.wikipedia.org/wiki/Raft (computer science)

Advantages of these formal distributed consensus algorithms are that they are mathematically rigorous and allow distributed systems to agree consensus on a single result such as when choosing a single node in the distributed system that should be responsible for a particular role.

The disadvantages are that the protocols are complex, heavyweight, hard to implement correctly, can become very slow in the presence of node failures, and can fail to make progress and provide a definitive answer at all e.g. if more than half the nodes are offline or there is a network partition. Many common formal distributed consensus algorithms sacrifice availability on the altar of consistency—which is the wrong trade-off for many high availability applications such as those involved in video conferencing.

Furthermore, these algorithms provide a strong guarantee of correctness that is often not needed for many applications.

Another solution is simplistic voting algorithm as illustrated in FIG. 2. A simplistic voting algorithm might provide a "good enough" rather than guaranteed perfect consensus. For example, one such algorithm could involve a node 201 proposing 202 a result (e.g. "I am responsible for this particular task") and that node 201 ensuring that all other nodes 203, 204 acknowledge 203A, 204A receipt of this message and their agreement to this proposal. In the event of there being disagreement e.g. because two or more nodes make competing conflicting proposals near simultaneously, some sort of tie-breaker or randomised back-off may be used to arrive at a consistent result.

Advantages of this approach are that it is lightweight, easy to understand and implement, and good enough for many scenarios where strong mathematical rigour is not required (e.g. although undesirable, it would not be a total disaster if both halves of a distributed system in a network partition did end up doing the same work).

Furthermore, it is a true distributed algorithm with high availability and no single point of failure as it requires no single entity to be in charge of making decisions or allocating work. This means it can provide answers in the face of significant outages where less than half the nodes are reachable (or, indeed, right down to the extreme point of there being only one solitary node left alive).

Disadvantages of this approach include the number of messages that are required (for a distributed system of n nodes, at least 2×(n−1) messages are required to be sent on the network as every node needs to receive and acknowledge each proposal.

Thus, there is a need for a solution being able to balance work items required to be completed by the system as a whole over the available computing systems in a conference node cluster in a fair and efficient manner, still being able to scale up and down as a cluster grows and shrinks, as well as to automatically work around any temporary node outages without the need for complex protocols becoming very slow in the presence of node failures, and still limiting the need for message exchanges between nodes and the required network load.

SUMMARY

In view of the above, an object of the present invention is to overcome or at least mitigate drawbacks of prior art video conferencing systems.

In particular, the present invention discloses a method of a distributed videoconferencing system having at least one conference node cluster including a number of conference nodes each capable of processing a number of work items, exchanging an "available" or "not available" status of each conference node through an out-of-band signaling system providing continuous status awareness of each node in each node, including the steps of pseudo-randomly mapping each of the number of work items to a respective associated work item point on a virtual consistent hashing circle, pseudo-randomly mapping each of the number of conference nodes to a number of associated buckets located on associated bucket points on the virtual consistent hashing circle, allocating the work items to the respective buckets associated with the closest located bucket points relative to a predefined direction on the virtual consistent hashing circle, when the status of a first one of the conference nodes is changing from "available" to "not available", then reallocating work items allocated to the number of buckets associated with the first one of the conference nodes to corresponding buckets associated with the closest bucket points relative to the predefined direction on the virtual consistent hashing circle, when the status of a second one of the conference nodes is changing from "not available" to "available" then reallocating work items allocated to the number of buckets associated with the second one of the conference nodes to corresponding buckets associated with the closest bucket points relative to the opposite of the predefined direction on the virtual consistent hashing circle.

The present invention also discloses a corresponding distributed videoconferencing system and a computer program.

These further aspects provide the same effects and advantages as for the first aspect summarized above.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
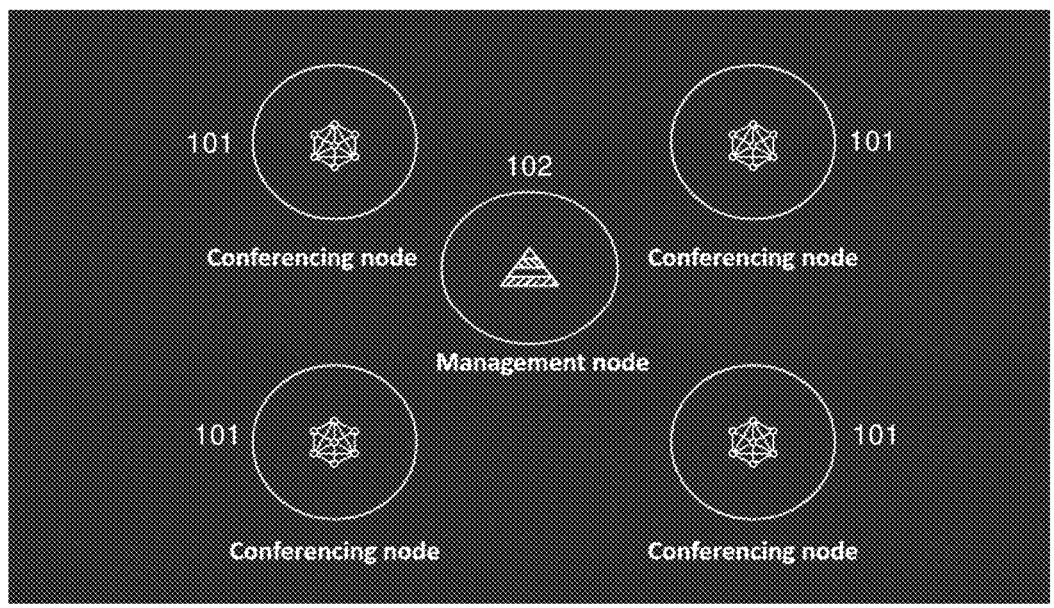
FIG. 1 schematically illustrates a distributed video conferencing system.
Figure 2:
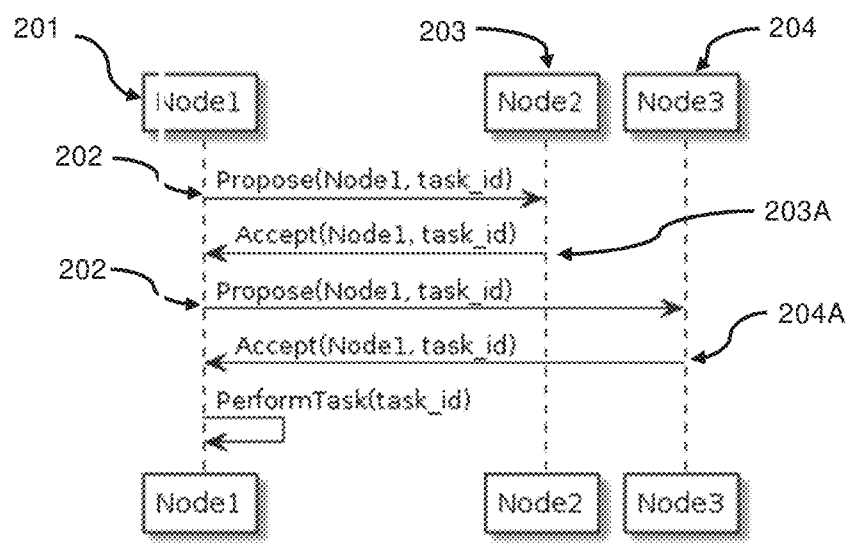
FIG. 2 is a flowchart illustrating simplistic algorithms according to prior art.

According to embodiments of the present invention as disclosed herein, the above-mentioned disadvantages of solutions according to prior art are eliminated or at least mitigated.

The present invention provides balancing of work items required to be completed as a whole over the available computing systems in a conference node cluster, in addition to providing sufficient redundancy among conference nodes by means of consistent hash functions.

Consistent hashing is based on mapping each object or work item to a point on a virtual circle. The system maps each available machine or node to many pseudo-randomly distributed points on the same circle, where these points are sometimes known as virtual nodes or "vnodes".

To find where a work item should be placed, the system finds the location of that work item's key on the circle; then walks around the circle until falling into the first bucket it encounters. The result is that each bucket contains all the resources located between each one of its points and the previous points that belong to other buckets. In redundant scenarios (where p>=1 as discussed below) an item may be placed into multiple (1+p) buckets where the buckets are found by walking around the circle until the required number of buckets, each belonging to a unique node, are found.

If a node and hence a bucket becomes unavailable, for example because the computer it resides on is not reachable, then the points it maps to will be removed. Requests for resources that would have mapped to each of those points now map to the next highest points. Since each bucket is associated with many pseudo-randomly distributed points, the resources that were held by that bucket will now map to many different buckets. The items that mapped to the lost bucket must be redistributed among the remaining ones, but values mapping to other buckets will still do so and do not need to be moved.

A similar process occurs when a bucket is added. By adding new bucket points, we make any resources between those and the points corresponding to the next smaller angles map to the new bucket. These resources will no longer be associated with the previous buckets, and any value previously stored there will not be found by the selection method described above.

The portion of the keys associated with each bucket can be altered by altering the number of angles that bucket maps to.

For the purpose of illustrating several embodiments of the present inventions, the following should be assumed:
- A distributed computing system collection of n cooperating nodes, each with a unique node_id similar to a work item key as discussed above;
- All nodes having a shared understanding via some out of band mechanism of the set S of currently alive/reachable nodes in the system;
- All nodes may have knowledge of which services are running on the other alive, reachable nodes by some out of band mechanism;
- A number of different software services with instances may be running on the cooperating nodes, with different instances of the same type of service sharing the same service_id;
- A number of work items, w, each with a unique work_id;
- A consistent hash function f;
- A key combining function k;
- A requirement for a level of redundant processing p (e.g. for n+1 redundancy, p=1; for n+2 redundancy p=2 etc.)

According to a first aspect of the present invention, the consistent hash function f is used to determine for each work item w which of the n+p nodes in the set S are responsible for handling the work item identified by the hashed key which is derived from the work_id (and optionally the service_id). In the case it is just required to determine which work items are to be processed locally, no further message exchange is required with other nodes.

The pseudocode algorithm for determining if work items are to be processed locally according to the first aspect of the present invention may be as follows:
S=set(reachable_nodes_in_cluster)
for w in work_items:
  key=k(service_id, w.work_id)
  chosen_node_ids=f(key, S)[0:1+p]
  If local_node_id in chosen_node_ids:
  # process work item locally
. . .

It then (optionally, if the particular application, for example, ADP leader selection, demands it) may exchange further coordination messages with the quorum of nodes selected to propose and/or otherwise agree some outcome.

According to a second aspect of the present invention, certain OTJ server work assignment scenarios, may require no additional coordination messages to be exchanged.

Other applications, such as ADP leader selection or similar, might require additional coordination messages to be exchanged as the nodes chosen themselves must work together as a micro-cluster with a sub-set of conference nodes in the conference cluster, to redundantly and scalably perform the required work in such a manner that if one of them becomes unavailable part way through performing the task, the other nodes can step in and take over.

Figure 3:
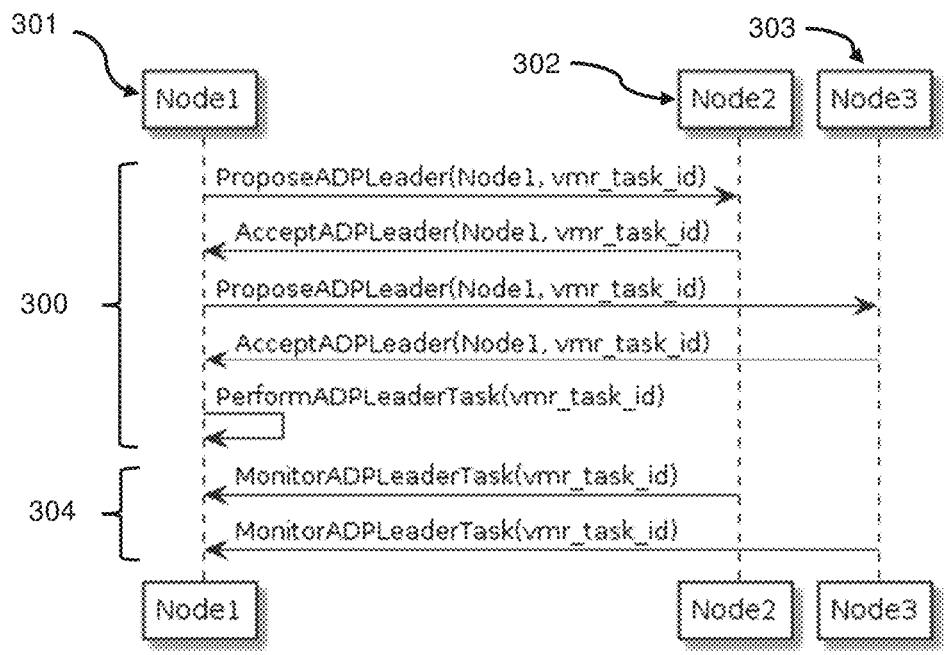
FIG. 3 is a flowchart illustrating simplistic algorithms when used in connection with certain embodiments according to the present invention.

In this situation, as illustrated in FIG. 3, the message exchange might take a form similar to the simplistic voting algorithm 300 described earlier, and the nodes 302, 303 might make a persistent or semi-persistent note of which node 301 is the ADP leader and monitor 304 its performance of the tasks associated with the role (ready to step in, hold another election and take control should that node fail before completing its duties).

The pseudocode algorithm according to the second aspect of the present invention for determining what subset of reachable nodes to involve in a subsequent coordination message exchange:
S=set(reachable_nodes_in_cluster)
for w in work_items:
  key=k(service_id, w.work_id)
  chosen_node_ids=f(key, S)[0:1+p]
. . .
  perform_coordination_exchange(chosen_node_ids)
. . .

In a third aspect of the present invention, if there are constraints around the nodes which should be involved, for example, if they are required to exist in a particular network or geographical locality, or the nodes are required to possess some capability or characteristic, the set S can be constructed to only include only eligible candidate nodes. This aspect also applies to the first and the second aspect as discussed above.

According to a fourth aspect, if there are requirements that the set of nodes computed includes nodes satisfying certain criteria, for example, having a diversity of geographical locations in geo-redundant scenarios, the set returned by the consistent hash function f may be filtered until sufficient nodes satisfying those criteria are found. This aspect also applies to the first, second and third aspect.

The pseudocode algorithm according to the fourth aspect of the present invention may be as follows:
S=set(reachable_nodes_in_cluster)
for w in work_items:
  key=k(service_id, w.work_id)
  chosen_node_ids=f(key, S)
  filtered_node_ids=extract_nodes(chosen_node_ids, criteria)
  perform_coordination_exchange(filtered_node_ids)
. . .

Embodiments of the present invention scales out as more servers are added. As the length of the list of work items increases beyond the capacity of a single node to process those work items efficiently, the work items processing load is spread across all the nodes in the distributed system with minimal coordination overhead. Solutions like Cisco Telepresence® Management Suit (TMS) and Cisco TelePresence® Management Suite Extension for Microsoft Exchange (TMSXE) do not scale out by adding more servers; instead if you need to improve performance your only option is to buy a more powerful server.

Further, work duplication may be minimised (redundant scenarios) or eliminated entirely. In competitive solutions such as Polycom® Cloud Relay all cloud relays in a particular tenant are sent all notifications pertaining to that tenant, the service will communicate to all available relays.

In addition, simplified, lowered load when rebalancing of the work if the number of available nodes change is provided, as not all the work items will need reallocating, thanks to consistent hashing.

Moreover, having an active/active redundancy model avoids the performance and reliability pitfalls of having a single "leader" node responsible for coordinating the work flow as is the case with systems with Active/Passive redundancy where a single node could become a scaling bottleneck and/or a single point of failure. This compares well to TMS 14.4 and TMSXE which have an Active/Passive model. Synergy Sky Join also provides high availability via an Active/Passive model.

By dynamically selecting the node(s) involved in handling a particular work item this avoids running a heavyweight consensus protocol between all nodes to agree what work is done where.

Finally, embodiments of the present invention significantly reduce (or eliminate) network coordination messages pertaining to the allocation of work items across nodes.

In summary, the present invention balances various design concerns to provide a lightweight mechanism that:

Allows a distributed system of cooperating nodes to divide work items approximately fairly amongst themselves without requiring a central node to coordinate this step;
Provides for simple failover to allow surviving node(s), on discovery of the death of one or more of their peers, to automatically divide and reschedule work items that would have been scheduled on unavailable nodes over the set of currently available nodes;
Ensures that, on discovery of new nodes in the cluster, a minimal subset of work items are reallocated to the new nodes.

According to some embodiments, the present invention is implemented in a OTJ server.

OTJ servers are responsible for conveying information about upcoming scheduled video meetings from enterprise calendaring systems, such as Microsoft Exchange, or Google Calendar, to endpoints so that, near the time that the meeting is scheduled to start, the endpoint is able to display a simplified user interface that allows meeting participants to join the desired meeting by pressing a single button, instead of having to type a hard-to-remember URI or conference number and passcode.

Figure 4:
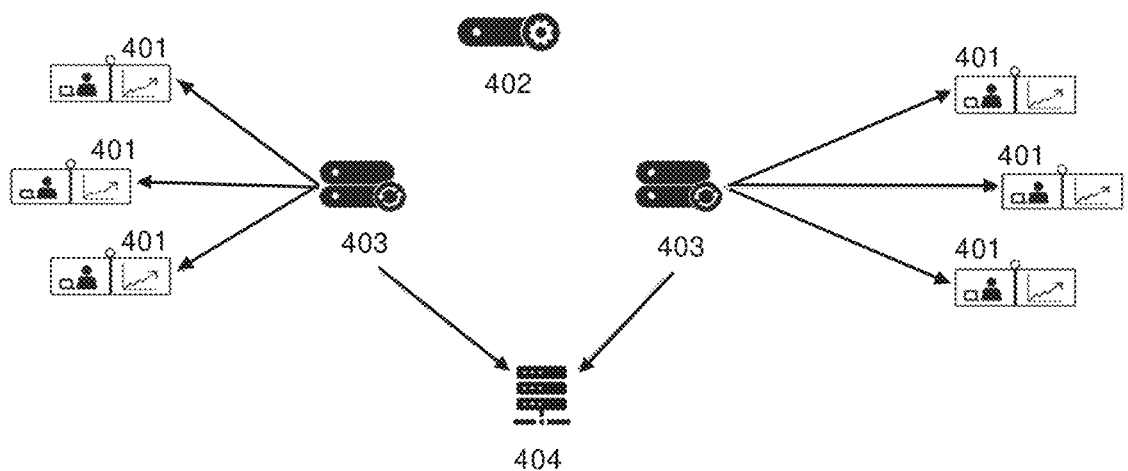
FIG. 4 schematically illustrates a distributed video conferencing system involving a calendar server.

In other words, work items are monitoring calendar servers for scheduled video conferences, and provide a user interface icon to endpoints participating in the scheduled video conferences, through which the endpoints enter the video conference. An example of a videoconferencing system 400 involving a calendar server 404, being able to providing OTJ, is illustrated in FIG. 4, comprises a plurality of endpoints 401, at least one management node 402 and a plurality of conferencing nodes 403.

The OTJ service must be designed and deployed so that it is highly reliable, in order to ensure that meeting details will be sure to be supplied to the endpoints ahead of time. A temporary failure of one or more OTJ servers should not result in a service outage as this could result in scheduled video meetings not being available to join using the simplified "one button" workflow, and consequential inconvenience to VTC end-users.

Furthermore, OTJ servers must also be scalable. If there are a large number of endpoints in an enterprise, multiple OTC servers may be required to monitor their calendars and provide service to the endpoints.

Additionally, calendaring systems usually have APIs with speed/performance limitations, limited capacity or quota limits. Therefore, the "One Button To Push" servers cooperating to provide service to an organisation's endpoints must collectively take care to ensure that they do not make an excessive number API requests to the calendaring systems (lest the calendaring systems rate-limit the OTJ servers, resulting in degraded performance).

In some embodiments of the present invention, the responsibility for monitoring calendar data can fairly be divided between nodes in order to ensure that all calendars are being monitored, with a selectable degree of redundancy.

This provides benefits in both OTJ "pusher" and "puller" architectures.

In "pusher" architectures, only the responsible node(s) need to monitor the calendars and push appointment information to the endpoints.

In "puller" architectures, the endpoints query a random node to "pull" the most up-to-date list of appointments, and the node which receives the query is able to quickly and decisively identify the authoritative node(s) for that query and proxy the query to solely the correct node(s) (and no others, thus avoiding wasted coordination messages) and then return the result back to the querying endpoint.

These embodiments of the present invention is better than other known solutions in the OTJ problem domain because it is an Active/Active redundancy model rather than an Active/Passive redundancy model because of the following:

It is an n way redundancy model; existing servers only offer 2-way redundancy and would be rendered inoperable by the failure of just two servers. This solution requires n servers to be rendered inoperable before it stops working;
Duplicated work between OTJ servers in a given deployment is kept to a minimum;
Consistent hashing ensures that, in the event of the size of the pool of available OTJ servers in a given deployment changing (e.g. due to failure of an existing server, or deployment of an additional server), only minimal workload rebalancing needs to take place; and
The rebalancing can happen automatically without requiring complex exchange of state between OTJ servers or coordination by some external controller to modify which server needs to take on particular aspects of changed workload.

In other embodiment, the present invention is implemented in connection with ADP dialout leader selection.

In the field of video conferencing servers, there exists the concept of Virtual Meeting Rooms (VMRs).

VMRs allow people using video conferencing or audio conferencing devices or software applications to meet together and mix and compose the audio and video streams from different participants to allow people to collaborate together in a video, audio video or audio conference. VMRs may be distributed over multiple nodes in a cluster to allow for the advantages that distribution brings to video conferencing.

A VMR may support both dial-in participants (where a participant triggers their audio or video system to join the meeting by dialing a number or URI of some sort) and/or dial-out participants—where the VMR system itself places a call to one or more participants.

In the case of dial-out participants, many VMR systems allow the configuration of Auto-dialed participants—that is; dial out participants who get called automatically, for example, triggered by the first dial-in participant entering a VMR. This is a very useful feature for personal VMRs as a personal VMR can be configured to automatically call it's owners personal video system.

In the case of a distributed VMR system, the question arises as to which node is responsible for dialing out the ADPs if 2 or more dial-in participants dial into the same distributed VMR on different nodes simultaneously or near simultaneously. Some sort of selection process is required to determine which node is responsible for dialing the automatic participants or there is a risk that they will receive two incoming calls (undesirable).

In other words, work items are monitoring dial-ins from endpoints participating in scheduled video conferences, and dialing out to the other endpoints participating in scheduled video conferences.

This embodiment of the present invention is better than other known solutions in the ADP dialout leader selection problem domain because:

In the general case, it only requires coordination messages to be exchanged with a small subset of nodes to determine which node is responsible for leading the ADP dialout effort. Both a rigorous consensus algorithm and a simplistic leader selection algorithm (like the one described earlier) would incur greater coordination overhead.

It is an active-active redundancy model that prioritises availability and partition tolerance over strict correctness— and will continue working so long as at least one node in the cluster is functional. As previously noted, some common rigorous consensus algorithms might fail to come to a consensus if there are major outages.

According to a third embodiment, the present invention is used in feature server selection. Associated with the above discussed VMR audio/video calls, there may be additional associated services to enhance the collaboration process.

Examples of these might include:

Document services—services which process and/or store any documents that are shared between participants Annotation Services—services which allow participants to annotate a shared document Chat services—services which relay, process and optionally store any text chat that is occurring between participants Recording services—which make persistent recordings of a conference Streaming services—which stream a conference to external participants Transcription services—which transcribe the audio spoken during a conference so that the text can subsequently be archived, searched etc.

Feature server load balancers—load balancers which themselves "front" feature services made use of by the conferencing system as a whole Such services may be hosted by standard video conferencing servers, or they might be hosted by specialist "feature servers" with special characteristics that differ from other video conferencing servers, such as access to capacious and/or high speed persistent storage.

The approach according to the third embodiment, could be used to allocate work over available feature servers.

The main advantages of the present invention is that it significantly reduces the number of nodes required to engage in message exchange to reach a consensus, and, in certain scenarios does away with the need for further exchange messages at all (beyond those already in place to track the liveness of other nodes in the cluster).

In the general case, where m way redundancy is required, only m of the n nodes need to be contacted to arrive at consensus where m<=n.

In certain common, useful scenarios, m may be zero. For example, if the work items to be processed are already known to all members of the cluster by some out-of-bands mechanism, and all nodes are aware of the liveness and ability to process work of all of the other nodes in the cluster (by some other out-of band mechanism), the work items may be divided fairly between the nodes without any further message exchange whatsoever, thus reducing load on the network and reducing the effect of network transmission latency between nodes on the nodes' ability to arrive at a consensus. This is a clear advantage over other approaches.

The approach works for allocating both static work item lists (known to all members of the cluster) and for dynamic work items that arrive for dispatch at a random node in the cluster.

Where m is greater than 0 (e.g. n+1 or n+p redundancy is desired rather than exclusive processing by only one node), thanks to consistent hashing not all processors of the work need to be reassigned and reallocated if the number of available nodes in a cluster increases or decreases (e.g. an existing node goes offline or a new node comes online in the cluster)

No manual administrator intervention is required to rebalance workloads when the number of available nodes in a cluster increases or decreases;

Only minimal amount of "work" is rebalanced when the number of available nodes in a cluster increases or decreases;

Reduction of failure domain: In the event of byzantine failures where, for example, a node is reported as being alive but fails to respond in a timely or correct manner to message proposals from other nodes, the likelihood of that node being consulted in the first place is reduced from 100% (as is the case with common formal distributed consensus algorithms and the simplistic voting algorithm described) to a lesser degree (with greater reductions the larger the cluster is).

This limits the impact of one misbehaving node on the others; and

The invention does not require centralized, shared storage of state.

Figure 5:
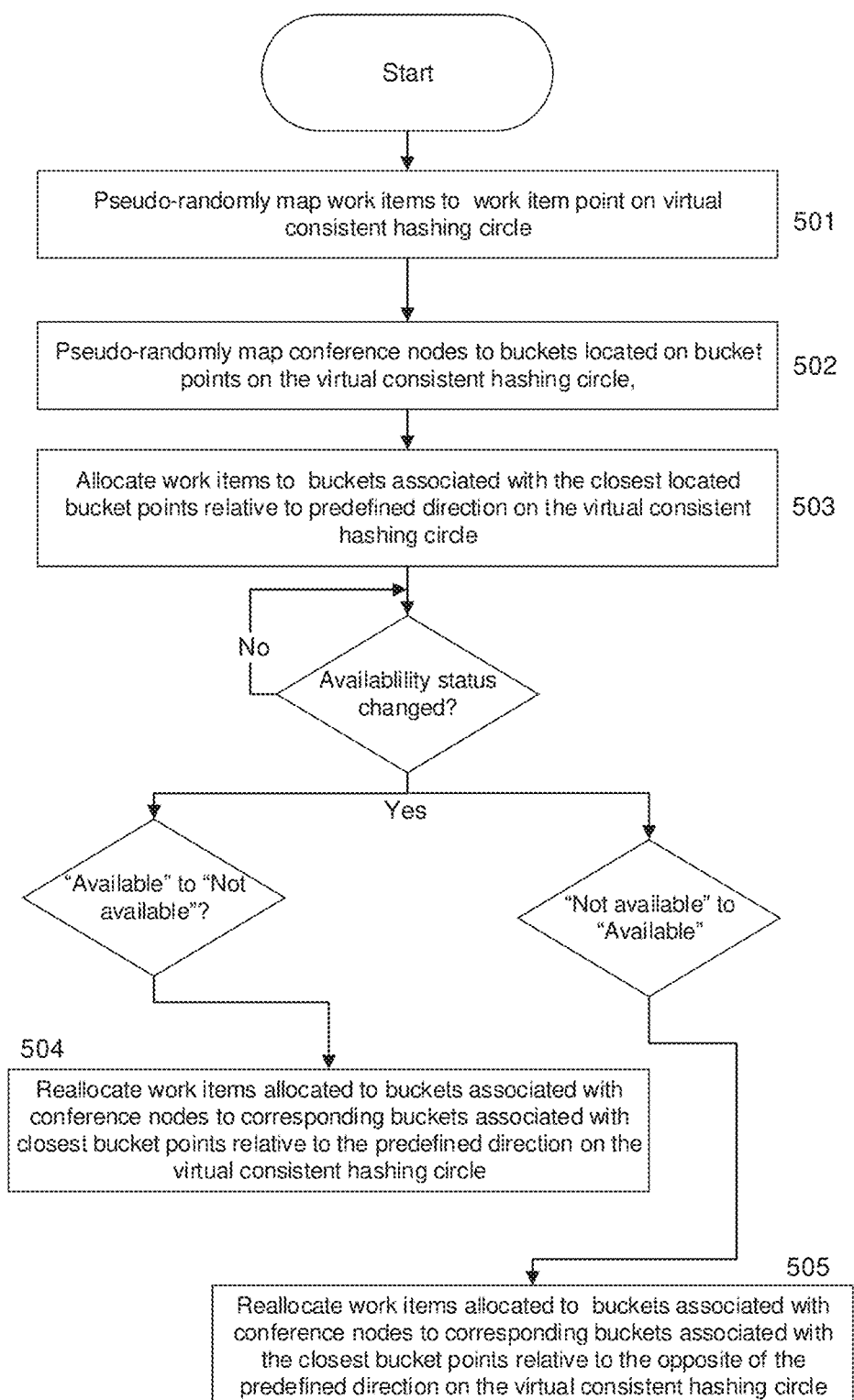
FIG. 5 is a flowchart illustrating an exemplary method according to the present invention.

FIG. 5 is a flowchart illustrating an exemplary method of the present invention of a distributed videoconferencing system having at least one conference node cluster including a number of conference nodes each capable of processing a number of work items, exchanging an "available" or "not available" status of each conference node through an out-of-band signaling system providing continuous status awareness of each node in each node, comprising the steps of:

pseudo-randomly mapping each of the number of work items to a respective associated work item point on a virtual consistent hashing circle 501, pseudo-randomly mapping each of the number of conference nodes to a number of associated buckets located on associated bucket points on the virtual consistent hashing circle 502, allocating the work items to the respective buckets associated with the closest located bucket points relative to a predefined direction on the virtual consistent hashing circle 503, when the status of a first one of the conference nodes is changing from "available" to "not available", then reallocating work items allocated to the number of buckets associated with the first one of the conference nodes to corresponding buckets associated with the closest bucket points relative to the predefined direction on the virtual consistent hashing circle 504, and when the status of a second one of the conference nodes is changing from "not available" to "available" then reallocating work items allocated to the number of buckets associated with the second one of the conference nodes to corresponding buckets associated with the closest bucket points relative to the opposite of the predefined direction on the virtual consistent hashing circle 505.

As used herein, the terms "node" and "server" may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a cloud system, which may comprise a set of server machines. In case of a cloud system, the terms "node" and "server" may refer to a virtual machine, such as a container, virtual runtime environment, a software module or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything therebetween.

As used herein, the terms "first", "second", "third" etc. may have been used merely to distinguish features, apparatuses, elements, units, or the like from one another unless otherwise evident from the context.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

What is claimed is:

1. A method of a distributed videoconferencing system having at least one conference node cluster including a number of conference nodes each capable of processing a number of work items, exchanging an "available" or "not available" status of each conference node through an out-of-band signaling system providing continuous status awareness of each node in each node, characterized in:
    pseudo-randomly mapping each of the number of work items to a respective associated work item point on a virtual consistent hashing circle,
    pseudo-randomly mapping each of the number of conference nodes to a number of associated buckets located on associated bucket points on the virtual consistent hashing circle,
    allocating the work items to the respective buckets associated with the closest located bucket points relative to a predefined direction on the virtual consistent hashing circle,
    when the status of a first one of the conference nodes is changing from "available" to "not available", then reallocating work items allocated to the number of buckets associated with the first one of the conference nodes to corresponding buckets associated with the closest bucket points relative to the predefined direction on the virtual consistent hashing circle,
    when the status of a second one of the conference nodes is changing from "not available" to "available" then reallocating work items allocated to the number of buckets associated with the second one of the conference nodes to corresponding buckets associated with the closest bucket points relative to the opposite of the predefined direction on the virtual consistent hashing circle.

2. The method according to claim 1, characterized in the further steps in a local conference node in the conference cluster identified by a local node id:
    determining whether a work item with a predefined work id is to be processed in the local conference node by:
        calculating a hash value from the work id and the number conference nodes in the conference cluster by means of a consistent hash function, and if the hash value maps to a bucket associated to the local node id, then
        processing the work item in the local conference node.

3. The method according to claim 1, characterized in the further steps in a sub-set of conference nodes in the conference cluster, identified with a sub-set of conference node ids:
    determining whether a work item with a predefined work id is to be processed in the sub-set of conference nodes by:
        calculating a hash value from the work id and the number conference nodes in the conference cluster by means of a consistent hash function, and if the hash value maps to a bucket associated to a conference node in the sub-set of conference node ids, then
        performing a coordination message exchange in the sub-set of conference nodes through the out-of-band signaling system.

4. The method according to claim 3, characterized in the following additional step:
    selecting conference nodes to the sub-set of conference nodes that have a diversity of geographical locations for providing geo-redundancy.

5. The method according to claim 1, characterized in that at least a first one of the one or more work items is monitoring one or more calendar servers for scheduled video conferences, and at least a second one of the one or more work items is to provide a user interface icon to endpoints participating in a scheduled video conference through which the endpoints enter the video conference.

6. The method according to claim 1, characterized in that at least a first one of the one or more work items is monitoring dial-ins from an endpoint participating in a scheduled video conference, and at least a second one of the one or more work items is to dial out to the other endpoints participating in the scheduled video conference.

7. A distributed videoconferencing system having at least one conference node cluster including a number of conference nodes each capable of processing a number of work items, exchanging an "available" or "not available" status of each conference node through an out-of-band signaling system providing continuous status awareness of each node in each node, characterized in that the distributed videoconferencing system is operative to:
  pseudo-randomly mapping each of the number of work items to a respective associated work item point on a virtual consistent hashing circle,
  pseudo-randomly mapping each of the number of conference nodes to a number of associated buckets located on associated bucket points on the virtual consistent hashing circle,
  allocating the work items to the respective buckets associated with the closest located bucket points relative to a predefined direction on the virtual consistent hashing circle,
  when the status of a first one of the conference nodes is changing from "available" to "not available", then reallocating work items allocated to the number of buckets associated with the first one of the conference nodes to corresponding buckets associated with the closest bucket points relative to the predefined direction on the virtual consistent hashing circle,
  when the status of a second one of the conference nodes is changing from "not available" to "available" then reallocating work items allocated to the number of buckets associated with the second one of the conference nodes to corresponding buckets associated with the closest bucket points relative to the opposite of the predefined direction on the virtual consistent hashing circle.

8. The distributed videoconferencing system according to claim 7, characterized in that in a local conference node in the conference cluster identified by a local node id, the distributed videoconferencing system is further operative to:
  determining whether a work item with a predefined work id is to be processed in the local conference node by:
    calculating a hash value from the work id and the number conference nodes in the conference cluster by means of a consistent hash function, and if the hash value maps to a bucket associated to the local node id, then
  processing the work item in the local conference node.

9. The distributed videoconferencing system according to claim 7, characterized in that in a sub-set of conference nodes in the conference cluster, identified with a sub-set of conference node ids, the distributed videoconferencing system is further operative to:
  determining whether a work item with a predefined work id is to be processed in the sub-set of conference nodes by:
    calculating a hash value from the work id and the number conference nodes in the conference cluster by means of a consistent hash function, and if the hash value maps to a bucket belonging to a conference node in the sub-set of conference node ids, then
    performing a coordination message exchange in the sub-set of conference nodes through the out-of-band signaling system.

10. The distributed videoconferencing system according to claim 9, characterized in that the distributed videoconferencing system is further operative to:
  selecting conference nodes to the sub-set of conference nodes that have a diversity of geographical locations for providing geo-redundancy.

11. The distributed videoconferencing system according to claim 7, characterized in that at least a first one of the one or more work items is monitoring one or more calendar servers for scheduled video conferences, and at least a second one of the one or more work items is to provide a user interface icon to endpoints participating in a scheduled video conference through which the endpoints enter the video conference.

12. The distributed videoconferencing system according to claim 7, characterized in that at least a first one of the one or more work items is monitoring dial-ins from an endpoint participating in a scheduled video conference, and at least a second one of the one or more work items is to dial out to the other endpoints participating in the scheduled video conference.

* * * * *